Feb. 13, 1934. A. G. KOHLER 1,946,536
DISHWASHING MACHINE
Filed Oct. 25, 1928 5 Sheets-Sheet 4
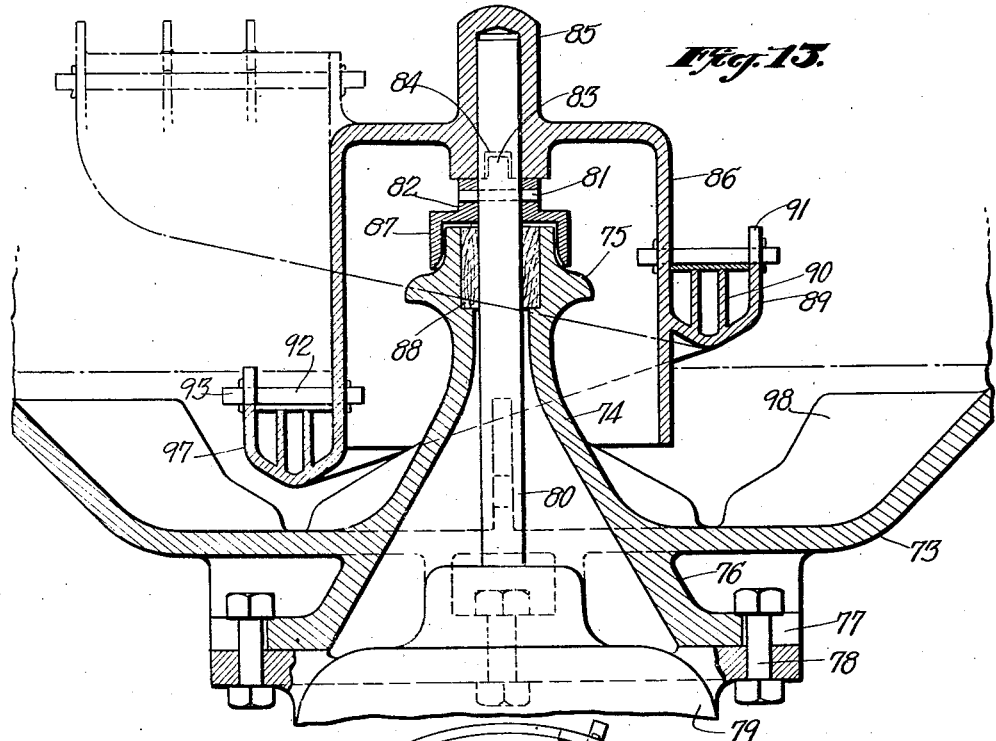
Fig. 13.
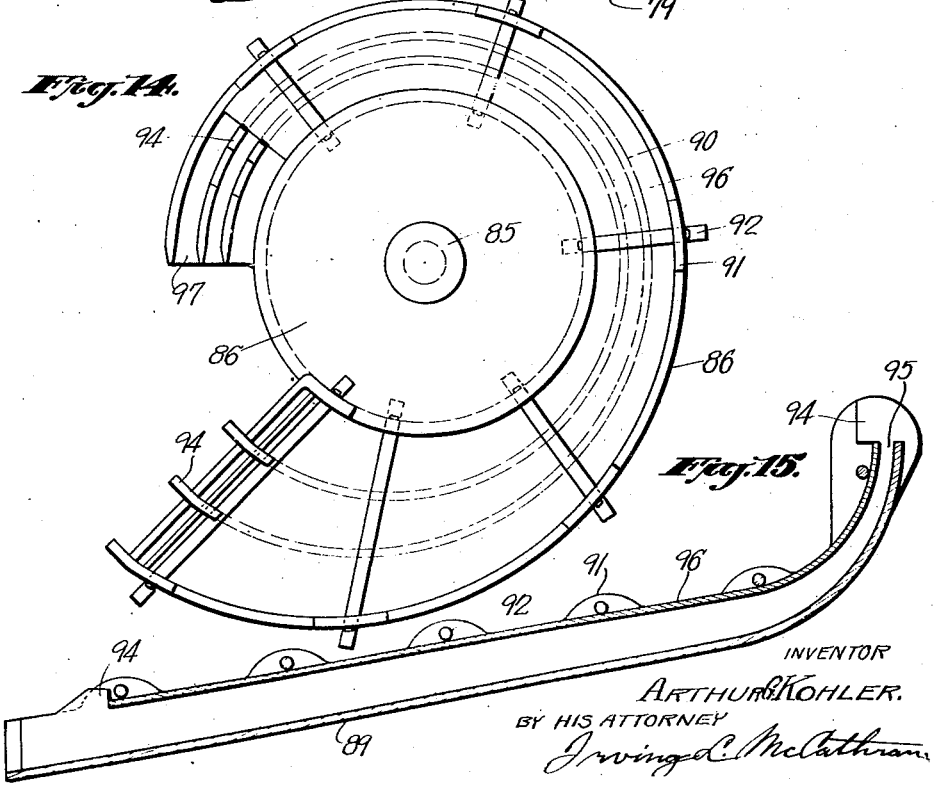
Fig. 14.
Fig. 15.
INVENTOR
ARTHUR G. KOHLER.
BY HIS ATTORNEY
Irving L. McCathran Feb. 13, 1934.  A. G. KOHLER  1,946,536
DISHWASHING MACHINE
Filed Oct. 25, 1928  5 Sheets-Sheet 5
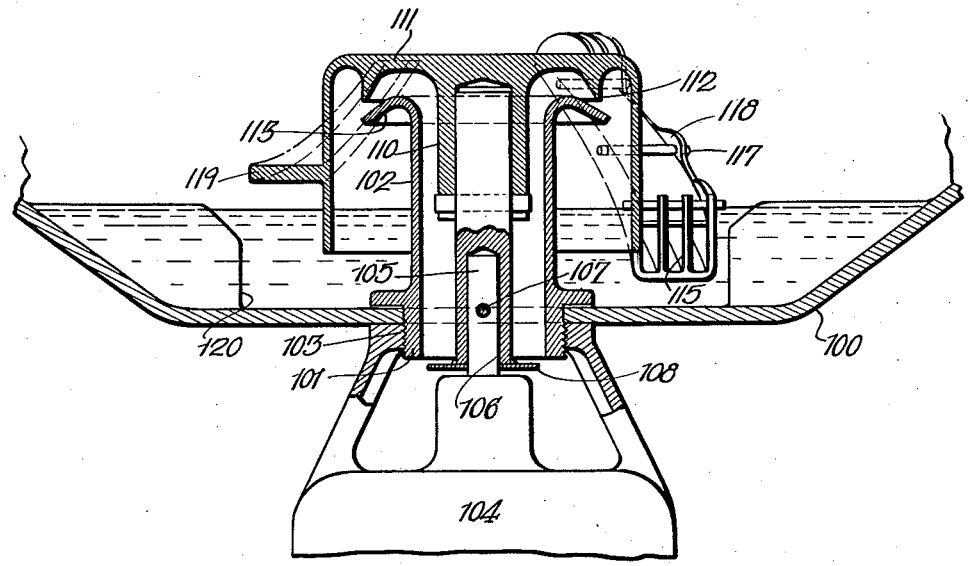
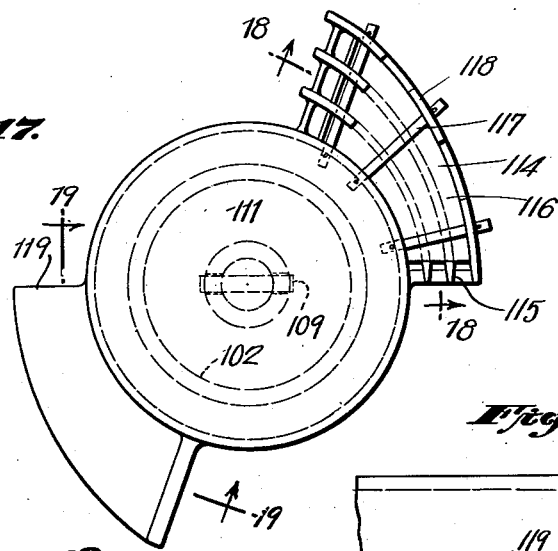
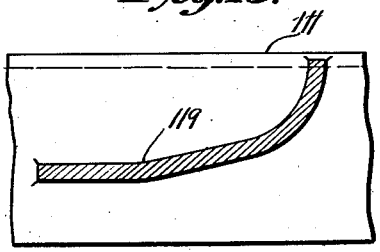
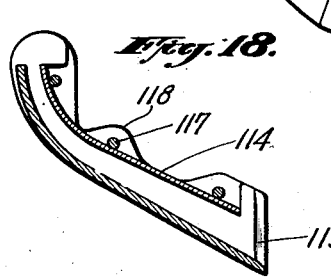
Inventor
ARTHUR G. KOHLER.
By his Attorney
Irving L. McArthur Patented Feb. 13, 1934

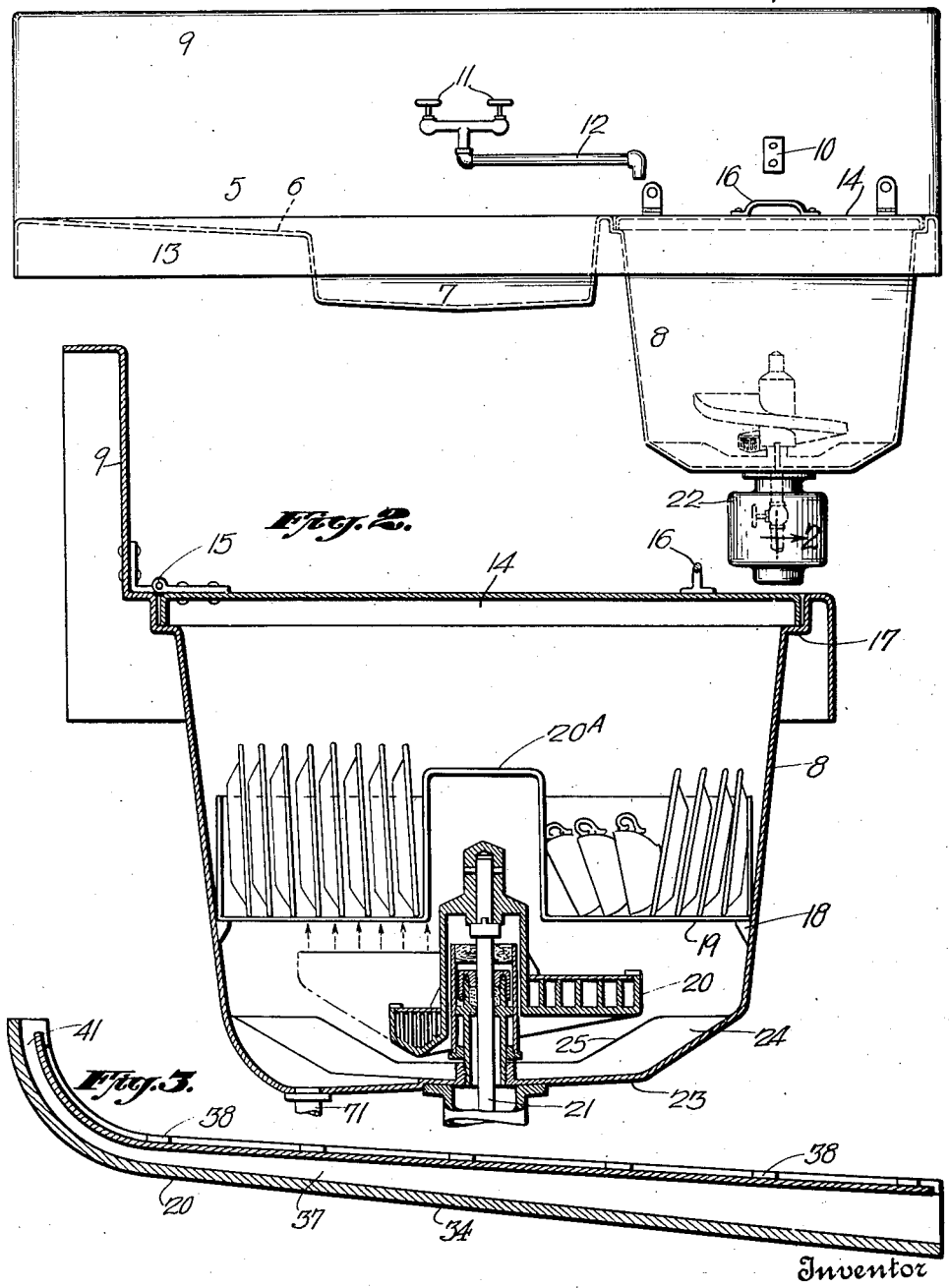

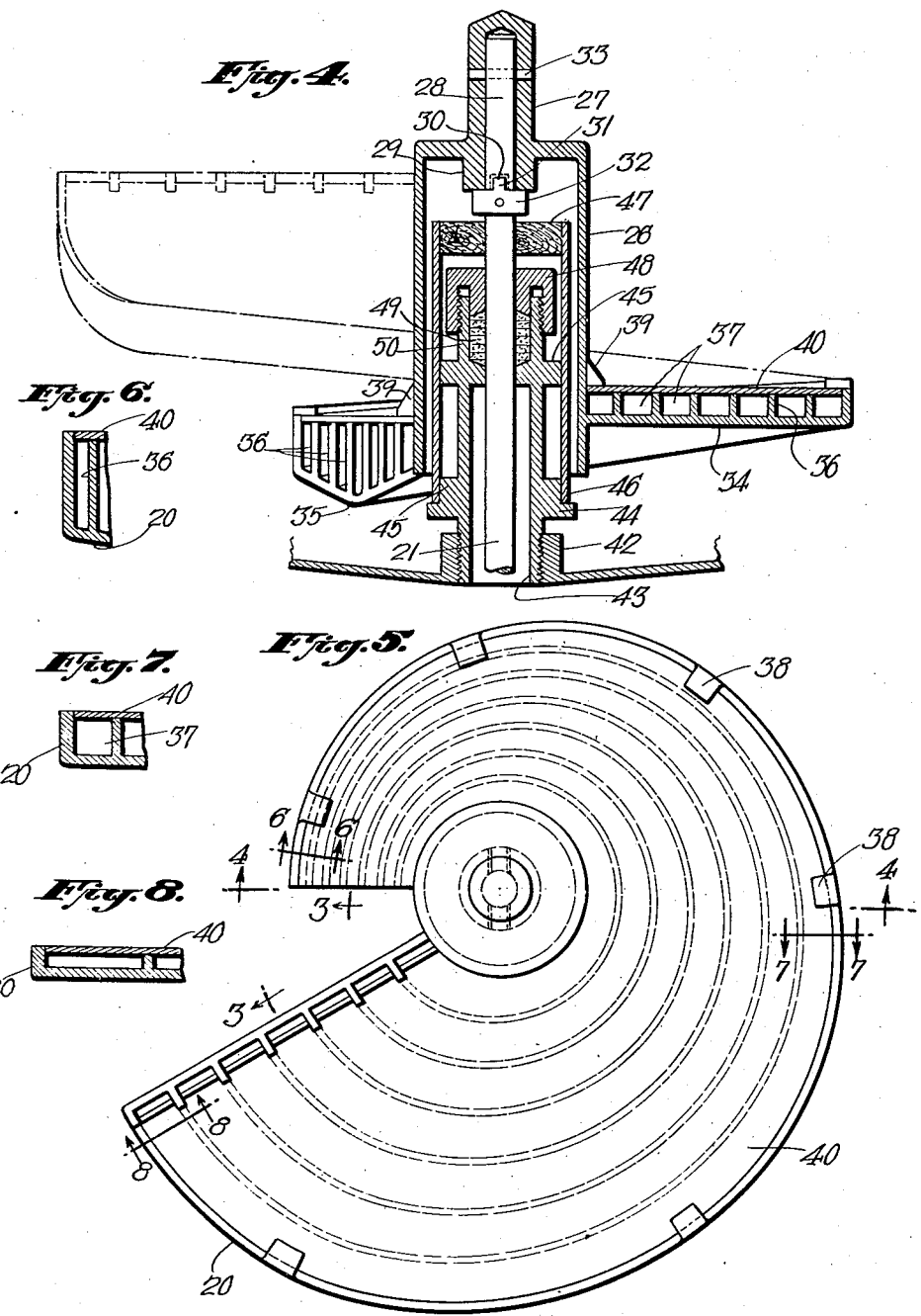

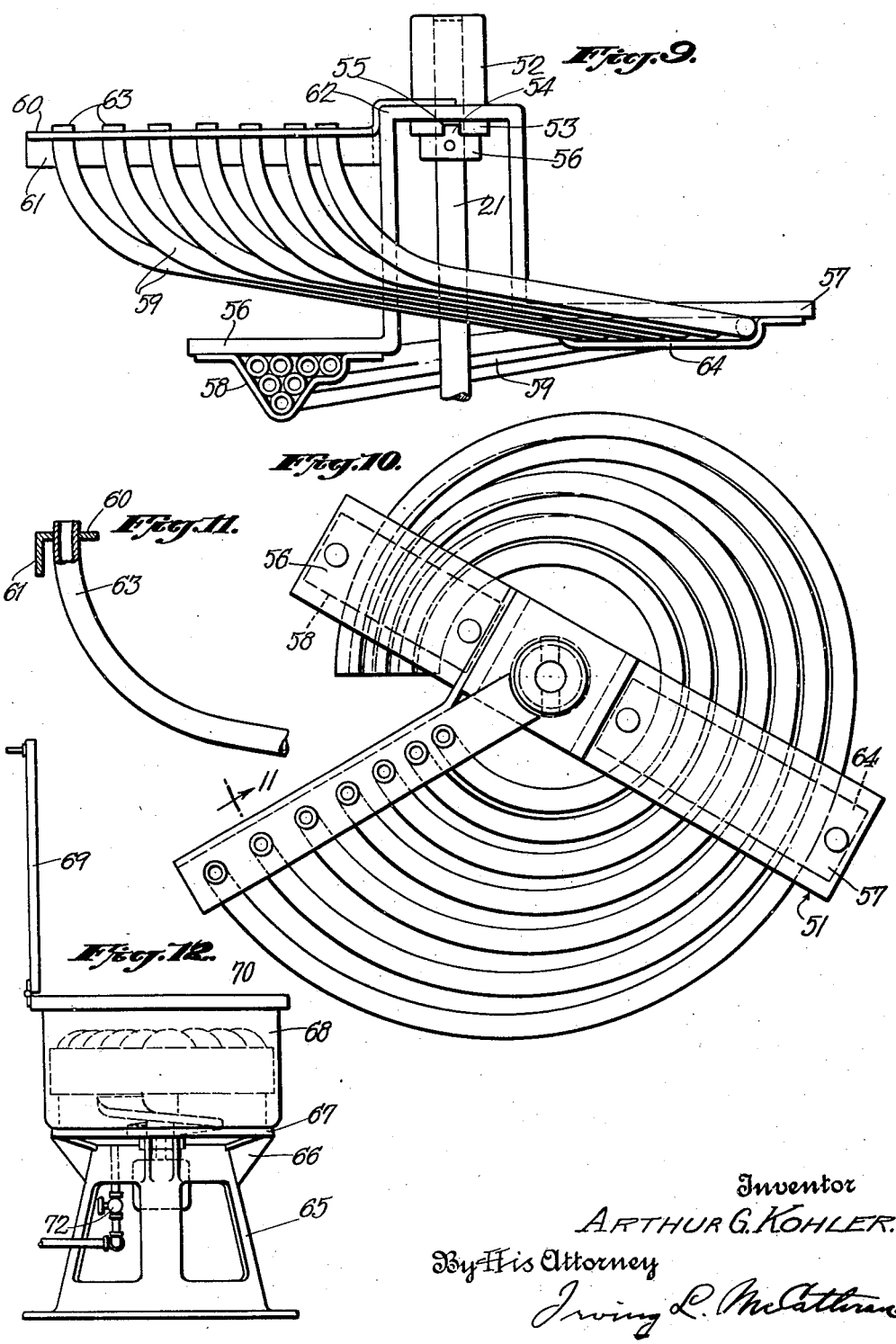

1,946,536

UNITED STATES PATENT OFFICE 1,946,536

DISHWASHING MACHINE

Arthur G. Kohler, New York, N. Y.

Application October 25, 1928. Serial No. 315,066

6 Claims. (Cl. 299—63)

This invention relates to washing machines and in particular to a type adapted for the washing of dishes and dinnerware.

A particular object of the invention is to provide a compact dish washing machine which consists of three essential parts, a tank in which the dishes are held, a motor and a water projecting device for throwing the water against the dishes to be cleaned.

A still further object of the invention is to provide a water projecting member for use in connection with a dish washing machine which will be so formed that its intake portion will extend a lesser distance from the center of rotation than will the discharge outlet thereof, it being further desired to provide a rotor or water projector whose outlet end will be higher than the inlet end whereby the water will be thrown in a vertical stream radially of the center of rotation to effectively clean all the dishes within the washing machine.

A still further object of the invention is to provide a water projecting device which will be arranged spirally of the center of rotation and one to which a high speed of rotation may be imparted so that the proper force may be imparted to the water so that it will thoroughly cleanse the dishes when it impinges thereon.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in front elevation of a sink showing how my improved washing machine may be built as an integral part of the sink construction.

Figure 2 is a section taken on the line 2—2 of Figure 1, the same being enlarged to illustrate the construction and arrangement of the dish washing machine.

Figure 3 is a developed section taken on the line 3—3 of Figure 5, illustrating the construction of the water projecting member shown in Figure 2.

Figure 4 is a section taken on the line 4—4 of Figure 5, and illustrating the construction of the water projecting member.

Figure 5 is a top plan view of the water projector or nozzle employed to throw the water upwardly in a travelling spray so that it will correctly impinge upon the dishes to be cleansed.

Figure 6 is an enlarged section taken on the line 6—6 of Figure 5 showing the cross sectional shape of one of the water passageways or flues.

Figure 7 is a similar view taken at a higher point in the water projector or nozzle, the section being taken on the line 7—7 of Figure 5.

Figure 8 is also a view similar to Figure 6 but taken adjacent the extreme outlet end of the projector and showing how the passageway or flue has assumed a flattened nature so that a wall of water is provided during the operation of the water projector or nozzle.

Figure 9 is a view in elevation of a modified form of water projector, the same being made up of a plurality of tubes which are suitably held together in a rotor frame.

Figure 10 is a top plan view of the rotor or water projecting device illustrated in Figure 9.

Figure 11 is a section taken on the line 11—11 of Figure 10 and illustrating how the outlet ends of the tubes are maintained in a suitable tube end holder.

Figure 12 is a view in side elevation of my washing machine as it would appear when mounted upon a stand for use as an individual unit, not in any way connected with a sink.

Figure 13 is a view similar to Figure 4 of a modified form of my invention, in which the bottom of the tank is shaped to provide a support for the nozzle member.

Figure 14 is a top plan view of the rotor member or nozle, as illustrated in Figure 13, and, Figure 15 is a sectional view developed through the length of the nozzle, showing how the top plate is held in position and also the general construction of the nozzle.

Figure 16 is a view similar to Figure 13 of a further modification of my invention in which a segmental water projecting flue member is employed in connection with a rotor cap, the same being counterbalanced at the opposite sides of the cap through the medium of a suitable counterweight.

Figure 17 is a top plan view of the water projecting member.

Figure 18 is a section taken on the line 18—18 of Figure 17 and shows a development through the left of the water projecting nozzle, and Figure 19 is a section taken on the line 19—19 of Figure 17 showing a developed section of the counterweight.

Referring to the drawings in detail, 5 indicates a sink of the usual type, preferably cast from iron or other metal and provided with the drain board 6, sink portion 7 and my washing machine tank 8. The sink construction is further provided with a back 9 upon which is mounted a suitable switch 10 through the medium of which the motor that drives the washing machine may be stopped and started. The sink is provided with the usual hot and cold water controls 11 to which is fastened the swinging outlet 12 so that the washing machine tank 8 may be filled, as desired.

The sink construction is finished off by the front apron 13 and the tank 8 is closed through the medium of a suitable cover 14 which is hinged as at 15 to the sink back 9, this cover being provided with a suitable handle 16 through the medium of which it can be raised. The cover 14 is arranged to fit snugly within the upper part of the tank 8 which is provided with a peripheral offset or step 17 so that the water, when it impinges upon the under side of the cover 14, will be drained back into the tank 8.

The interior of the tank is provided with suitable lugs 18 upon which rest a dish holding tray 19, the center of which is formed as at 20—A to provide a handle whereby the tray may be lifted in and out of the tank 8. Any suitable form of tray 19 may be employed, preferably made round to fit the contour of the tank and constructed of meshed wire which will permit the greatest amount of water to pass therethrough for impingement upon the dishes to be cleaned. This tray 19 is supported in the tank a suitable distance above the outlet of the water projector 20 which is mounted on the upper end of a motor shaft 21 which is driven by the motor 22 secured in any suitable manner, such as by bolts to the bottom 23 of the tank 8, as illustrated in Figures 1 and 2. The bottom of the tank is also provided with suitable baffles 24 which are cut out at their centers as at 25 in order to permit rotation of the water projecting member, the baffles acting, of course, to prevent rotation of the water as a body in connection with the water projecting nozzle.

In the forms shown in the Figures 1 to 8, this water projector 20 may be made of any suitable metal such as aluminum, which is light, durable, non-corroding and easily cast, the whole being cast to provide a bonnet portion 26 whose upper end is closed and has cast concentrically therein, a bored sleeve 27 which is arranged to receive and act as a journal for the upper end 28 of the motor shaft 21. This sleeve 27 has an inwardly projecting portion 29 whose diametrically opposite edges are notched as at 30 to receive the sleeve engaging projection 31 formed on the supporting collars 32 which is pinned or otherwise secured to the motor shaft 21. It is quite evident that rotation of the motor shaft is transmitted through this supporting collar 32 to the bonnet 26 and causes rotation thereof at any suitable speed depending upon the capacity of the motor. If desired, the upper end of the motor shaft 21 may be pinned as at 33 to the sleeve 27 to further secure the bonnet in position on the end of the shaft 21. The bonnet 26 has cast integral therewith and spirally thereabout, a horizontally extending projector portion 34 whose radial distance increases from the bottom to the top. The bottom or intake end is cast angularly to provide the proper cross section for the flues whereby the smallest radial distance is obtainable at the intake end. The projector extension 34 has cast thereon upstanding ribs 36 defining a plurality of water flues or passageways 37 which, it will be noted, decrease in depth from bottom to top in a definite proportion to the increase of radial distance whereby substantially the same cross sectional area is maintained from intake end to outlet end of the projector. This construction has a very distinct advantage over the spraying devices at present in use in that the water at the inlet is taken in at a lesser radial distance from the drive shaft and therefore does not offer as much resistance to the operation of the projector. Further, the water taken in attains a high velocity in its centrifugal, spiral movement. The outer periphery of the projector is provided with lugs 38, see Figures 5 and 4, which, in cooperation with lugs 39 provided on the outer surface of the bonnet 26 maintain in position on top of ribs 36, a suitable cover plate 40. This cover plate 40 extends from the inlet to the outlet end of the projector and at this time, it will be noted that the discharge end of the projector, as illustrated in Figure 3, in a developed view thereof, is turned up so that the outlet port thereof, permits the ejection of water in a vertical plane whereby it will impinge upon the dishes held in the basket or tray 19. This turned up end of the projector is indicated by the numeral 41.

The flues at the intake end of the projector are elongated vertically as indicated in Figure 6. At Figure 7 they have become practically the same width as height while at the outlet end, as indicated in Figure 8, they have again assumed their elongated shape but in a horizontal direction so that the water taken in adjacent the turning point of the projector is thrown by the rotation thereof centrifugally through the flues and emerges at very high speed from the outlet end of the projector and through the flues which, being flattened or elongated, cause the water to emerge in a thin wall which extends radially of the center of rotation and in its travel sweeps all of the dishes above the outlet end of the projector thus thoroughly cleansing them, due to the force of the water projected. In order that the shaft 21 may be rotatably positioned, in the tank, without danger of the water in the tank seeping out and down the motor shaft, I have provided in the bottom 23 of the tank, the hub 42 which is threaded to receive the lower threaded end 43 of a journal 44. This journal is provided with suitable extensions 45 upon which are suitably held a journal casing 46 which is tubular in formation and whose upper end is closed through the medium of a wooden closure ring 47. The wooden ring closely fits about the shaft 21 and acts as an additional means for keeping any water from passing into the journal casing in which is disposed about the shaft 21, a packing cap 48 whose shaft engaging portion is arranged to compress the packing 49 positioned about the shaft and within the threaded end 50 of the journal 44.

It is quite evident through the medium of this construction, no water can seep out around the packing to find its way down the motor shaft exteriorly of the tank 8 and it is also evident that by the simple connection afforded between the end of the motor shaft 21 and the bonnet portion 26 of the projector that the latter can be removed very readily for cleaning or repair or replacement by simply removing the basket 19 from the tank 8 and removing the pin 33 from the sleeve portion of the bonnet.

In the modified form of projector illustrated in Figures 9 to 11, suitable tubing may be employed and arranged in a rotor frame 51 which may be constructed of light metal and may carry at its center a sleeve 52 in the under portion 53 of which may be formed a suitable slot 54 for the reception of the extended portion 55 of a collar 56 carried on the motor drive shaft 21. This sleeve 52 may also be secured to the motor shaft 21 through the medium of a pin, if desired.

The rotor frame in its opposite reaches 56 and 57 is lower in the former than in the latter, this being so in order that the tubes may be supported spirally about the motor shaft 21, there being provided beneath the extension 56, a strap 58 which holds the flue tubes 59 in substantially triangular shape and in net formation at the intake end thereof while the outlet ends are suitably swedged into the horizontal portions 60 of an angle iron extension piece 61 which is secured to the center portion 62 of the rotor frame, the tubes being bent so that the ends thereof 63 are disposed vertically so that water leaving said ends will be projected vertically for impingement upon the dishes supported in the tray. The intermediate portions of the tubes 59 are arranged flat against the under side of the projection 57 of the rotor frame and are maintained in their proper relation to each other through the medium of the strap 64 which is suitably secured to said extension 57 of the rotor frame. It is quite evident that in a construction of this character the same object is attained that is possible with the projector illustrated in Figures 4 and 5.

It is quite evident, therefore, that either the cast projector or the one made up from the tubes 59 may be employed in the dish washing machine and it is to be further noted that under certain conditions, one might wish to employ the projector device made from the tubes and might under certain other conditions wish to employ the cast projector.

In Figure 12, I have illustrated my washing machine as supported upon a suitable stand 65, the upper end of which is provided with extending brackets 66, supporting a top 67 upon which the tank 68 is mounted, the tank being provided with the usual cover 69 and upper offset edge 70 to receive said cover, so that the water thrown up by the projector will drain back into the tank. In all forms of my invention, the tank is preferably sloped at its bottom toward the rear and a suitable drain 71 is threaded into the bottom so that the tank may be emptied after a washing operation, this drain being closed through the medium of a suitable valve 72 which is manipulated when emptying of the tank is desired.

In the modification as illustrated in Figures 13, 14 and 15 I have cast in the bottom of tank 73 a cone shaped support 74, the upper end of which is provided with a rim 75 which is arranged to act as a water shed, the under portion thereof acting to deflect any water that may have a tendency to travel up on the cone surface. An extended portion 76 of this support member 74 below the surface of the tank 73 is slotted as at 77 to receive the bolts 78 which are arranged to hold the motor 79 in position against said projected portion 76, the motor shaft being indicated by the numeral 80 and having pinned thereto as at 81 the key sleeve 82, the key 83 thereon being arranged to fit into a notch 84 provided in the bonnet sleeve 85 of the rotor or nozzle 86, the body thereof being bell shaped to fit over the nozzle 74. The key sleeve is provided with a depending apron 87, which fits down over the upper end of the support 74 and prevents water that drips off of the top of the bell shaped nozzle from getting into the motor shaft 80.

The motor shaft is journalled as at 88 in a wooden or fiber sleeve which is supported in a recessed portion of the upper end of the support 74, this sleeve fitting the motor shaft snugly and preventing any leakage of moisture into the motor. The bell shaped body portion of the nozzle 86 has cast thereon the nozzle flues 89 which are provided with the usual flue forming walls 90 as described in connection with the nozzle shown in Figure 4. In this instance however, the outer periphery of the nozzle is provided with perforated lugs 91 at spaced points for the accommodation of retaining pins 92 which are passed through suitable openings in the body portion of the nozzle and are maintained in position through the medium of suitable cotter pins 93.

It will be noted in Figure 15 that the intake end of the nozzle is provided on its flue walls 90 with the lugs 94. This being also true of the outlet end 95 of the nozzle, which is turned to vertical position. The lugs maintain in position a cover plate 96 which completes the definition of the flues.

It is quite evident that the intake end 97 of the nozzle is the lowest point of the entire nozzle construction, and is also arranged to pass between baffle plates 98 which are cast into or otherwise secured to the bottom of the tank 73.

The flues of this nozzle also widen out as they approach the outlet end thereof, so that the water will be effectively sprayed and will attain a very high speed due to the centrifugal movement thereof.

In the modified form of construction illustrated in Figures 16 to 19 inclusive, 100 indicates the tank, the bottom of which is provided with a central opening through which passes the neck 101 of a support member 102. The lower end of this support in its neck 101, is threaded and arranged to receive the threaded end 103 of the rotor 104, the motor shaft passes into the support 102 which is of tubular formation and said motor shaft 105 is secured in position in a sleeve 106 through the medium of the pin 107. A suitable shed rim or ring 108 being secured to the lower end of the member 106 and being employed for the purpose of draining off the water that might get into the support 102 whereby the same is prevented from finding access to the interior of the motor casing. The tubular member 106 is secured through the medium of the pin 109 within the depending portion 110 of the rotor 111. This rotor is bell-shape and is provided with intermediate depending ridges 112 which are positioned above the turned over or flared end 113 of the support 102. The rotor is preferably a cast member of some very light material of high tensile strength so that it can revolve at high speed and the depending rim 112 in cooperation with the flared portion 113 of the support 102, acts to prevent any water that may find its way or be splashed up into the rotor from getting inside the support 102 and flowing outside of the tank 100. The outer wall of the rotor 111 is cast to provide the flue chamber or water projecting member 114 which is similar in construction to the water projecting portion of the forms illustrated in Figures 4 and 13, inasmuch as it is provided with the flue defining walls 115 which decrease in height from entrance to exit end of the water projecting member. It will also be noted that the width of this water projecting member increases from intake to outlet end so that the water in passing into the flue chamber, receives a centrifugal impulse in passing therethrough and the fast moving stream of water leaves the projector which thoroughly cleanses the dishes.

In this instance, also, the walls 115 are so shaped that a cover plate 116 may be placed thereover to complete the definition of the water passageways, the plate being secured in position through the medium of suitable pins 117 which are secured between the wall of the rotor 111 and the outer wall of the water projecting member, suitable lugs 118 being provided in the latter for the reception of said pins.

It will be noted that this water projector extends spirally about the projector rotor 111 and occupies a segmental portion of the rotor less than 180 degrees, the rotor 111 being counterbalanced by the provision of a counterweight 119 which is cast integral therewith and in substantially the same opposite position on the rotor as is occupied by the water projecting member. The lower end of this counterbalance 119, it will be noted, is above the normal water line of the tank and in order to prevent the mass of water from rotating with the rotor, I may employ suitable baffles 120, as illustrated.

It will be quite evident that in the high speed rotation of the rotor member 111, the water will be scooped into the intake end of the water projecting member and it will lead the same in a vertical stream, this feature being indicated in Figure 18 in which the outlet end of the water projector is arranged vertically.

It is quite evident that in a construction of this character that the number of parts have been reduced to a minimum and also that the rotor construction is such that it can be readily removed for replacement, repair or cleansing.

It is also evident that no packing boxes need be employed in order to prevent the liquid in the tank from finding its way into the motor bearings or housing.

It is also evident that through the use of the segmental water projecting member, the water issuing therefrom will attain a high speed and will be effective in thoroughly cleansing the dishes.

It is evident therefore, that I have provided a dish washing machine which may be constructed as an integral part of a sink or one which may be used in connection with a stand individually. It is also evident that I have provided in a dishwashing machine a nozzle the intake end of which is radially nearer its turning point than is the outlet end thereof whereby a centrifugal force will be given the water during its travel through the nozzle and the result will be an emerging stream of water of greater pressure than the entering water at the intake end of the nozzle.

It is also evident that in a construction of this character the nozzle may be lifted off the end of the motor shaft for cleaning or replacement without interfering with any of the other parts of the machine.

It is also evident that the nozzle may be made of very light metal, which will be non-corroding and which will effectively throw the water in a solid stream across the dishes to be cleaned.

While I have illustrated and described my invention with some degree of particularity I realize that in practice various alterations therein may be made. I therefore reserve the right and privilege of changing the form of the details of construction or otherwise altering the arrangement of the co-related parts without departing from the spirit of the invention or the scope of the appended claims.

Having thus described my invention what I claim as new and desire to secure by United States Letters Patent is:—

1. In a dishwashing machine, a rotary water projector having a body portion, an extension thereon having vertical spirally extending ribs, said ribs defining water passageways, and a cover on the extension for closing the tops of the passageways, and said passageways changing in cross sectional shape from vertically elongated at the entrance end to horizontally elongated at the discharge end of said projector.

2. In a dishwashing machine, a rotary water projector having a body member, and a shaft engaging portion on said body member, a flange like extension thereon having vertical spirally extending ribs defining water passageways, a cover on the extension for closing the tops of the passageways and said passageways changing in cross sectional shape from vertically elongated at the entrance end to horizontally elongated at the discharge end.

3. In a dishwashing machine, a rotary water projector having a body portion, an extension thereon having spaced spirally extending ribs, said ribs defining water passageways, and a cover on the extension for closing the tops of the passageways.

4. In a dishwashing machine, a rotary water projector having a body portion, an extension thereon having vertical spirally extending ribs, said ribs being spaced further apart at one end than at the opposite end and defining water passageways and means for closing the tops of the passageways.

5. In a dishwashing machine, a rotary water projector having a central, vertically disposed sleeve portion a horizontal blade-like extension thereon having integral spaced ribs disposed at right angles to the upper surface of said extension, said extension being spirally disposed about said portion, and the ribs defining spiral water passageways, and means for closing the tops of the passageways.

6. In a dishwashing machine, a rotary water projector comprising a vertically disposed body and a shaft engaging portion on said body, a horizontal blade-like extension on the body of the projector, vertical ribs on the extension constituting spiral water passageways, said extension extending spirally of the body and increasing in diameter from bottom to top of said body, and a cover for said passageways.

ARTHUR G. KOHLER.